Sept. 29, 1970  G. V. WOODLING  3,531,226
BEARING SUPPORT MEANS AND DRIVE FOR ROTARY
VALVE IN FLUID PRESSURE DEVICE
Original Filed Nov. 21, 1967

INVENTOR.
GEORGE V. WOODLING
BY
Woodling, Krost, Granger and Rust.
attys.

United States Patent Office 3,531,226
Patented Sept. 29, 1970

3,531,226
BEARING SUPPORT MEANS AND DRIVE FOR ROTARY VALVE IN FLUID PRESSURE DEVICE
George V. Woodling, 22077 W. Lake Road, Rocky River, Ohio 44116
Continuation of application Ser. No. 684,705, Nov. 21, 1967. This application June 2, 1969, Ser. No. 829,268
Int. Cl. F01c 1/04
U.S. Cl. 418—61   5 Claims

ABSTRACT OF THE DISCLOSURE

The rotary valve is especially adapted to operate in a fluid pressure device having a stator element and a rotor element constituting a fluid stator-rotor mechanism, in which the stator element has a fixed axis and in which the rotor element has a movable axis with said rotor element having a rotational movement about its own axis and an orbit movement about the fixed axis. The rotary valve has a hollow shaft extending therefrom. Bearing support means having first and second sides rotatively supports the hollow shaft with the rotary valve disposed on the second side of the bearing support means. Actuating means drives the rotary valve from the rotor element with the actuating means engaging the hollow shaft from the first side of the bearing support means. The bearing support means preferably comprises anti-friction bearings. The actuating means may embody rotational phasing.

---

My invention relates generally to a fluid pressure device and more particularly to bearing support means and a rotational drive for a rotary valve in the fluid pressure device.

This application is an improvement in my Pat. No. 3,405,603, and a continuation of my application, Ser. No. 684,705, filed Nov. 21, 1967, now abandoned.

An object of the present invention is the provision of bearing support means including anti-friction bearings for supporting the rotary valve.

Another object is the provision wherein the rotary valve in the fluid pressure device has a hollow shaft extending therefrom supported by an anti-friction bearing unit.

Another object is the provision wherein the hollow shaft extends through, and has a terminating end portion provided with cam follower means projecting in an axial direction beyond the bearing unit.

Another object is to drive the cam follower means from the rotor element of the stator-rotor mechanism.

Another object is to drive the rotary valve by drive connection means located on the opposite side of the bearing support means from which the rotary valve is mounted.

Another object is to drive the rotary valve from the main shaft.

Another object is to drive the rotary valve from an intermediate portion of the actuating shaft which interconnects the main shaft to the rotor element.

Other objects and a fuller understanding of the invention may be had by referring to the following description and claims, taken in conjunction with the accompanying drawings, in which:

Figures 5, 6:
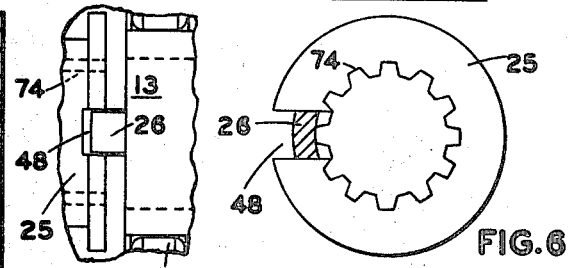

FIG. 5 is a fragmentary view of the end portion of the main shaft having a radial slot therein constituting cam actuating means for engaging the cam follower means on the end of the hollow shaft for driving the rotary valve, the view showing the hollow shaft unsectioned with the actuating shaft omitted and with the main shaft shown unsectioned; and FIG. 6 is a view of the end face of the main shaft in FIG. 5 showing the cam follower means in section and fitting into the slot in the end portion of the main shaft.

With reference to the drawings, the fluid pressure device is substantially the same as that shown and described in my above-mentioned patent and the description therein shall apply to this application with respect to common subject matter. The description in this application will be directed principally to the improvements.

Briefly, the fluid pressure device comprises a main housing 20, a main shaft 25 rotatively mounted in the housing, a stator-rotor mechanism 31 having a stator element 32 and a rotor element 33, a stationary valve member 29 and a rotary valve member 28. An end cap 34 enclosed the stator-rotor mechanism. The end cap may be held by a screw 35. An actuating shaft 39 drivingly interconnects the main shaft 25 to the rotor element 33. The actuating shaft 39 has an intermediate portion 38 disposed to rotate the rotary valve 28 through rotational drive means comprising a cam actuating member 40 extending outwardly therefrom. The stationary valve member 29 has face wall means including a stationary valve face 81 abutting against the end wall of the housing 20, whereby the housing and the stationary valve member constitute enclosure means for the rotary valve. The stationary valve member 29 may be secured to the end of the housing 20 by screws 30. The housing 20 is hollow from end-to-end, and intermediate the ends of the hollow housing, there is provided a bushing or annular body 22, which generally separates the hollow housing into a left-hand end compartment in which the main shaft 25 is rotatively mounted and a right-hand end compartment in which the rotary valve is rotatively mounted.

Figure 3:
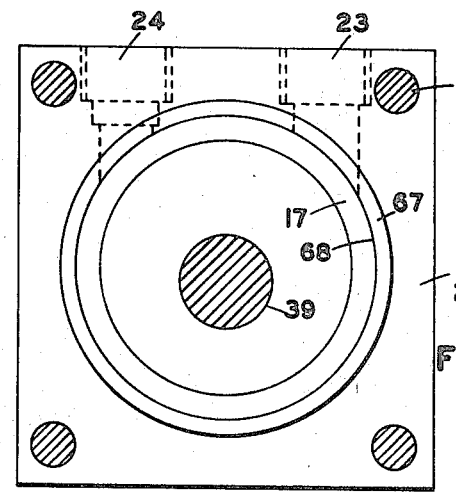
FIG. 3 is a view taken along the line 3—3 of FIG. 1, with the rotary valve and the anti-friction unit being omitted, the view showing principally the right-hand end of the hollow housing including a cross-section of the actuating shaft.
Figure 4:
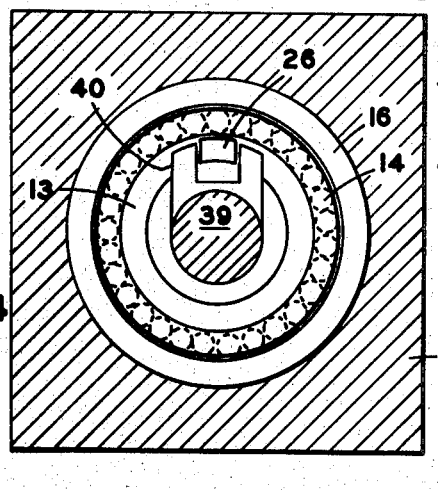
FIG. 4 is a view taken along the line 4—4 of FIG. 1, showing principally an end view of the anti-friction bearings and a cross-section of the actuating shaft with cam actuating means extending outwardly therefrom engaging cam follower means on the end of the hollow shaft.

The bushing or annular body 22 has inner and outer surfaces 18 and 19 and first and second side faces 16 and 17. The outer surface 19 fits into the bore of the housing 20 with the first side face 16 abutting against an annular shoulder 27 in the bore of the housing and with the second side face 17 having an annular portion constituting a stationary end face disposed substantially parallel to and spaced axially from the stationary valve face 81. The rotary valve 28 is mounted between the stationary valve face and the stationary end face and has a rotary valve face 82 which makes a fluid sealing engagement with the stationary valve face and a rotary end face 66 which makes a fluid sealing engagement with the stationary end face. The bushing or annular body 22 is axially secured in place by an abutment sleeve 67 which has an internal wall surface 68 surrounding and radially spaced from the rotary valve member 28 and defines therewith external annular fluid chamber means which extends all the way around the rotary valve member. The external annular fluid chamber is connected in constant fluid communication with a fluid port 23 provided in the housing 20, see FIG. 3.

The rotary valve member 28 has a hollow shaft 13 with inside and outside surfaces. The hollow shaft 13 extends from the rotary valve member and has a bearing portion mounted with an anti-friction roller bearing unit 14. The bearing unit 14 comprises a plurality of roller bearings encompassing the bearing portion of the hollow shaft 13 and mounted within a cup 15 which is pressed into the inner surface 18 of the bushing 22. The hollow shaft 13 extends through, and has a terminating end portion provided with cam follower means comprising a boss 26 projecting in an axial direction beyond the roller bearing unit 14.

The rotary valve member 28 has a central opening defined by internal wall surface means 76. This opening, including also the opening in the hollow shtaft 13, constitutes internal annular fluid chamber means connected in constant fluid communication with a fluid port 24 provided in the housing 20, see FIG. 3.

In this application, the term "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about said fixed axis of the stator. Thus, in this application, the outer surrounding element, usually referred to as the stator, may be either the stator or the rotor, depending upon whether it has a fixed axis or a movable axis and the inner element, usually referred to as the rotor, may be either the rotor or the stator depending upon whether it has a movable axis or a fixed axis.

In the description, my device will be described as a fluid motor, but it is understood that it may be utilized for any other related purpose, particularly a pump.

Figure 2:
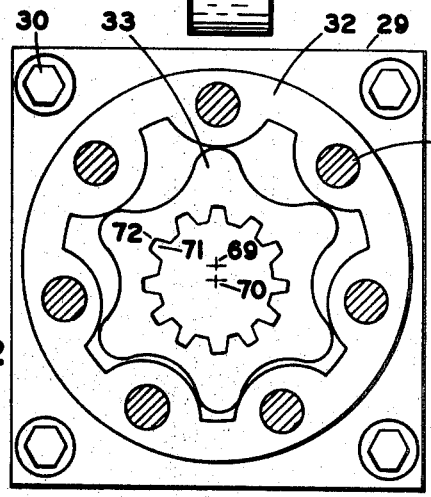
FIG. 2 is a view taken along the line under the end cap, showing the stator-rotor mechanism.

As illustrated in FIG. 2, the stator element 32 has seven internal teeth which defines the outer wall of a fluid compartment. The rotor element 33 has six external teeth, one less than that of the stator element. The stator elment may be described as having (n) number of internal teeth and the rotor element may be described as having (n−1) number of external teeth. The stator element has a center 69, usually referred to as the fixed or stationary axis since the stator element is stationarily mounted and does not rotate. In this application and claims, the expression "fixed stator axis" or simply "fixed axis," includes not only the fixed axis of the stator, but also any axis which coincides, or is in axial alignment therewith.

The rotor 33 has a movable axis, identified by the reference character 70, and is radially spaced from and moves in an orbital path about the fixed axis 69 of the stator. The orbital path of the movable axis 70 is a true circle with its center coinciding with the fixed axis of the stator. The diameter of the true circle, orbital path, is equal to the difference in the radial dimension between the crest contour and the root contour of a stator tooth. Upon relative movement between the rotor and the stator, the movable axis 70 of the rotor orbits in a true circle about the fixed axis of the stator. As the rotor moves within the stator, the intermeshing teeth of the rotor and stator divide the fluid compartment confined therebetween into high and low pressure chambers along a revolving divisional line passing substantially diametrically through the fixed axis of the stator. For the position in FIG. 2, the divisional line is substantially diametrically vertical. For the position shown in FIG. 2, the divisional line may be more properly described as a divisional tapering band rather than a line and comprises substantially a slender triangle having an apex at the point where the top rotor tooth in FIG. 2 touches or contacts the arcuate surface of the stator contour and having a base defined by the distance between the sealing contact engagement on opposite sides of the bottom rotor tooth when fitting full-depth into the bottom stator tooth.

To rotate the rotor 33 in a clockwise direction, the chambers on the left-hand side of the revolving divisional line or tapering band become high pressure chambers and the chambers on the right-hand side become low pressure chambers. The high and low pressure chambers, which may be referred to as operating chambers, alternately expand and contact as the rotor and stator move relative to each other. The divisional line or tapering band continually revolves in a counter-clockwise direction as the rotor rotates in a clockwise direction within the stator.

Figure 1:
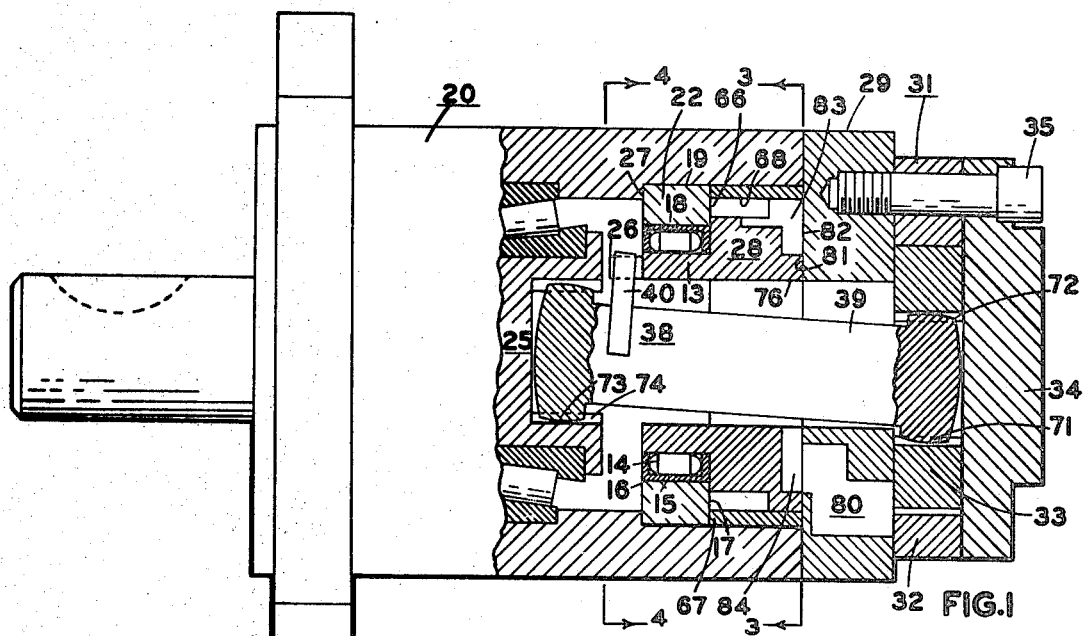
FIG. 1 is a top plan view of a fluid pressure device in which my invention may be mounted, parts being shown in section to illustrate the invention.

As shown in FIG. 1, the actuating shaft 39 has a right-hand end portion provided with male spline teeth 71 which fit within female spline teeth 72 in the rotor, being referred to herein as first connection means. Thus, the right-hand end portion of the actuating shaft 39 is disposed for rotational movement about its own movable axis and for orbital movement about the fixed axis of the stator. The connection means between the left-hand end portion of the actuating shaft 39 and the main shaft 25, herein referred to as second connection means, also comprises male spline teeth 73 on the actuating shaft 39 which fit within female spline teeth 74 in the central core of the main shaft 25. The left-hand end portion of the actuating shaft, that is the second connection means, is disposed for rotational movement substantially free from orbital movement about the fixed axis of the stator. A third connection means comprises the cam actuating member 40 provided on the intermediate actuating shaft portion 38. As illustrated, the cam actuating member 40 has a notch at the outer end thereof for engaging the boss 26 for rotating the rotary valve 28 one rotation for each rotation of the actuating shaft. The boss 26 makes a relative close sliding contact fit with the side walls of the notch. The clearance, however, is sufficient to permit orbiting of the actuating shaft.

In operation there is a disposition for the rotary valve to have a circumferential rotational phasing with respect to the rotation of the actuating shaft 39. During certain portions of the orbit movement of the actuating shaft, the rotational phasing has the effect of substracting from the rotation of the actuating shaft, with the result that the speed of rotation of the rotary valve is reduced. During other portions of the orbit movement, the rotational phasing has the effect of adding to the rotation of the actuating shaft, with the result that the speed of rotation of the rotary valve is increased. The rotational phasing makes a fresh start at the beginning of each orbit and terminates at the end of each orbit. The amount of the circumferential displacement resulting from the rotational phasing is a function of the radius of the orbital movement at the intermediate portion 38 of the actuating shaft. The rotational phasing has the effect of varying the timing of the rotary valve with respect to the movements of the rotor within the stator and produces a new valving action.

The valve system means in the present application, comprising the rotary valve member 28 and the stationary valve member 29, is the same as that shown and described in my above mentioned application. To this end, the rotary valve member 28 has a first series of six commutating fluid connection means 83 interconnecting the external annular fluid chamber means to the rotary valve face 82 which makes a fluid sealing engagement with the stationary valve face 81 and has a second series of six commutating fluid connection means 84 interconnecting the internal fluid chamber means to the rotary valve face 82. The first and second series of commutating connection means are alternately disposed with respect to each other and are circumferentially disposed relative to the fixed axis and spaced at annular intervals thereabout at substantially 30 degrees from each other. The stationary valve member 29 has seven fluid openings 80 communicating respectively with the operating fluid chambers in the stator-rotor mechanism. The seven fluid openings 80 in the stationary valve member 29 terminate respectively in the stationary valve face 81, with the fluid opening being circumferentially disposed about the fixed axis and spaced at annular intervals thereabout at 51 3/7 degrees from each other.

In operation as a fluid motor, high pressure fluid from the high pressure port 23 commutatively flow through the first series of commutating fluid connection means 83 of the rotary valve into the fluid openings 80 of the stationary valve member 29 and thence into the expanding pressure fluid chambers in the stator-rotor mechanism and drives the rotor 33 in a clockwise rotational direction within the stator 32. As the rotor is driven, the exhaust fluid in the low pressure contracting chambers commutatively flows through the fluid openings 80 of the stationary valve 29 into the second series of fluid commutating connection means 84 of the rotary valve and thence to the low pressure port 24. As the rotor is driven by the high pressure fluid, it operates the main shaft 25 through the actuating shaft 39.

The registration of the fluid connection means provided by the rotating valve face 82 in sealing engagement with the stationary valve face 81 is such that there is a first series of commutating fluid connections between the high pressure port 23 and the expanding fluid chambers in the stator-rotor mechanism and a second series of commutating fluid connections between the contracting fluid chambers and the low pressure port 24. The rotating valve 28 is independent of any radial thrust or of any end thrust to which the main shaft 25 may be subjected. Also the rotating valve 28 is substantially free from any radial thrust or any end thrust due to fluid pressure acting thereupon. In summary, the valve system means, including the rotary valve 28 and the stationary valve member 29, controls the entrance of fluid to and the exit of fluid from the operating chambers of the stator-rotor mechanism.

FIGS. 5 and 6 show a drive connection, whereby the rotary valve 28 is driven by the main shaft 25. In this drive, the end face of the main shaft 25 is provided with a radial slot 48 into which the boss 26 projects. The radial slot 48 constitutes cam actuating means or an abutment surface and the boss 26 constitute cam follower means or an abutment surface for rotating the rotary valve.

What is claimed is:
1. In a fluid pressure device having first and second fluid port means and fluid pressure operating means, first and second fluid connection means for respectively connecting said first and second fluid port means commutatively with said fluid pressure operating means, said first and second fluid connection means including stationary valve means and rotary valve means respectively having a stationary valve face and a rotary valve face mutually engaging each other in a transversely disposed plane, said first and second fluid connection means extending through said valve faces and including a plurality of circumferentially disposed fluid openings extending from said stationary valve face and communicating with said fluid pressure operating means, at least said first fluid connection means including first fluid chamber means in constant fluid communication with said first fluid port means, housing means, wall body means having face wall means in said housing means disposed substantially parallel to and spaced axially from said stationary valve face, said rotary valve means having a rotary valve shaft and a rotary valve body rotatably supported by said shaft, said rotary valve body having a first end portion including said rotary valve face and having a second end portion with a rotary end face in sealing engagement with said face wall means, said rotary valve body having first surface wall means extending externally therearound and radially spaced inwardly from said housing means, said rotary valve body also having first body portion means extending outwardly from said first surface wall means and separating said first fluid chamber means from said stationary valve face, said first body portion means having first and second opposed walls, said rotary valve face including said first opposed wall, said first fluid chamber means having chamber wall means including said first surface wall means and said second opposed wall, said wall body means having internal wall means defining substantially a central opening, said rotary valve shaft being hollow and having a smaller external dimension than that of said rotary valve body and projecting in an axial direction within said central opening from said rotary end face, bearing support means mounted in said central opening and carrying said rotary valve shaft and rotatably supporting said rotary valve body in said housing means, said first fluid connection means including a first series of commutating fluid conduction means extending through said first body portion means and commutating with and being one less in number than said plurality of fluid openings, and actuating means including rotational means driven by said fluid pressure operating means for rotating said rotary valve means relative to said stationary valve means.

2. The structure of claim 1, wherein said actuating means rotates said rotary valve means substantially one rotation for each rotation of said rotational means.

3. The structure of claim 2, wherein said actuating means includes an actuating shaft having first mechanical connection means with said rotary valve means and having second mechanical connection means with said fluid pressure operating means, said second mechanical connection means including male spline teeth on said shaft and female spline teeth in said fluid pressure operating means with said male spline teeth fitting within said female spline teeth.

4. The structure of claim 1, having a main shaft, an actuating shaft having first and second end portions interconnecting said main shaft and said fluid pressure operating means, and rotational means for rotating said rotary valve means from said main shaft.

5. The structure of claim 4, said main shaft being provided with first female teeth, said fluid pressure operating means being provided with second female teeth, said male teeth on said first end portion of said actuating shaft fitting within and being supported by said first female teeth, said male teeth on said second end portion of said actuating shaft fitting within and being supported by said second female teeth.

References Cited

UNITED STATES PATENTS

| 696,767 | 4/1902 | Sleeper | 91—56 X |
| 2,477,590 | 8/1949 | Ferwerda et al. | 137—625.21 |
| 3,087,436 | 4/1963 | Dettlof et al. | 103—130 |
| 3,261,235 | 7/1966 | Henkel | 91—56 X |
| 3,283,723 | 11/1966 | Charlson | 103—130 |
| 3,288,034 | 11/1966 | White et al. | 91—56 |
| 3,339,460 | 9/1967 | Birdwell | 103—130 X |
| 3,367,239 | 2/1968 | Takagi | 91—56 |
| 3,405,603 | 10/1968 | Woodling | 91—56 |

MARTIN P. SCHWADRON, Primary Examiner

I. C. COHEN, Assistant Examiner

U.S. Cl. X.R.

137—625.21